Figure 1:
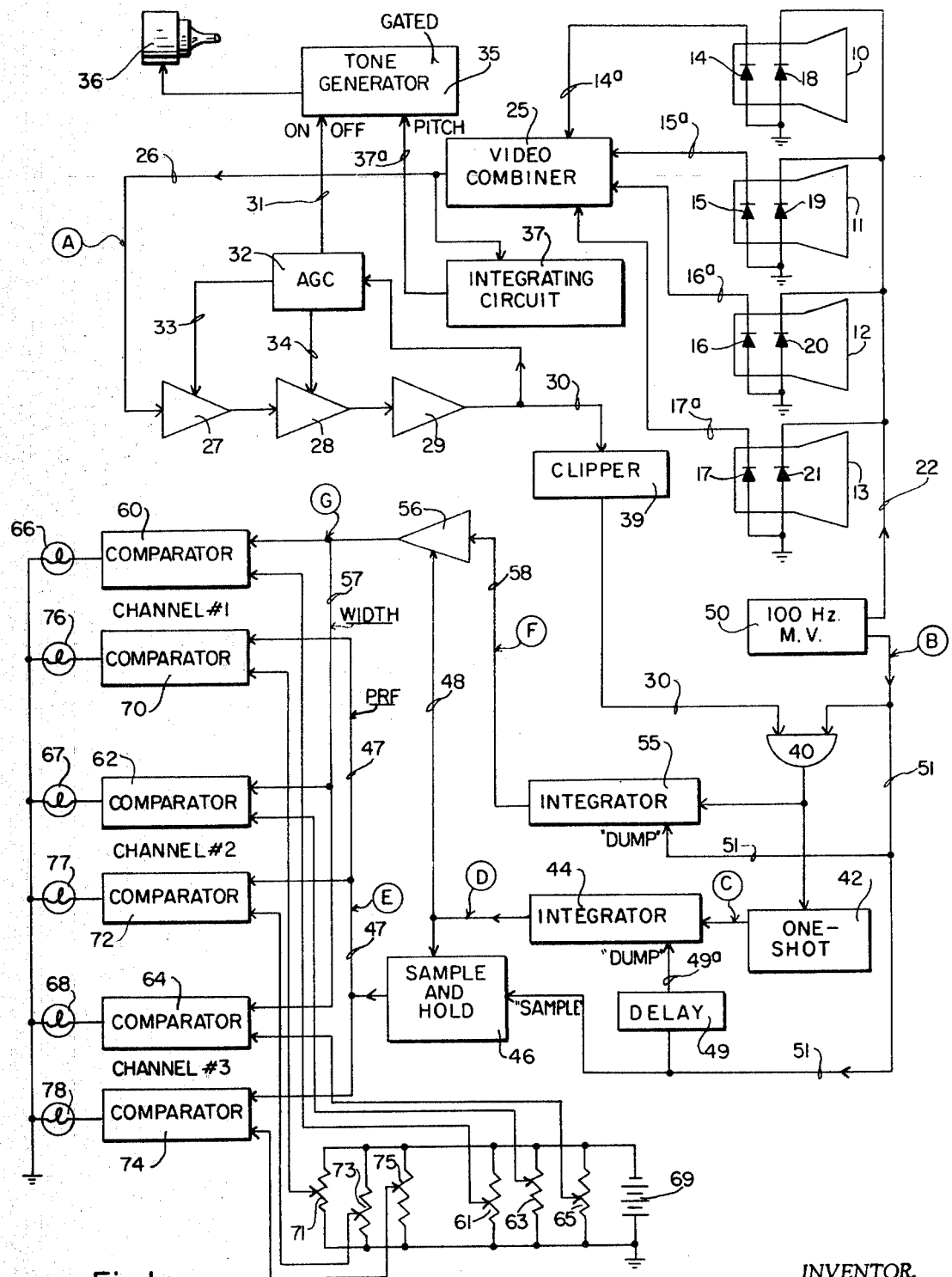

United States Patent
Potter

[15] 3,660,844
[45] May 2, 1972

[54] RADAR DETECTOR AND IDENTIFIER

[72] Inventor: Basil E. Potter, Williamsville, N.Y.
[73] Assignee: Sierra Research Corporation
[22] Filed: May 4, 1970
[21] Appl. No.: 34,296

[52] U.S. Cl. ............................................343/18 E, 325/363
[51] Int. Cl. ..........................................................G01s 7/40
[58] Field of Search................................343/18 E; 325/363

[56] References Cited

UNITED STATES PATENTS

| | | | |
|---|---|---|---|
| 2,522,551 | 9/1950 | Williams | 343/18 E X |
| 2,602,883 | 7/1952 | Koontz et al. | 343/18 E |
| 3,500,401 | 3/1970 | Miller et al. | 343/18 E |

Primary Examiner—T. H. Tubbesing
Attorney—Alexander & Dowell

[57] ABSTRACT

A radar detector and identifier device described with reference to an illustrative embodiment wherein the device is carried and used by persons, such as military personnel, to warn them when they are being illuminated by radar, to provide such persons with the capability of roughly determining the direction from which the radar illumination is coming, and especially to provide them with the capability of identifying the radar signal as originating from an enemy or a friendly source by identifying certain characteristics of the radar signal itself such as its pulse repetition frequency and its pulse width, the device also being operative to recognize CW signals.

8 Claims, 6 Drawing Figures

INVENTOR.
BASIL E. POTTER

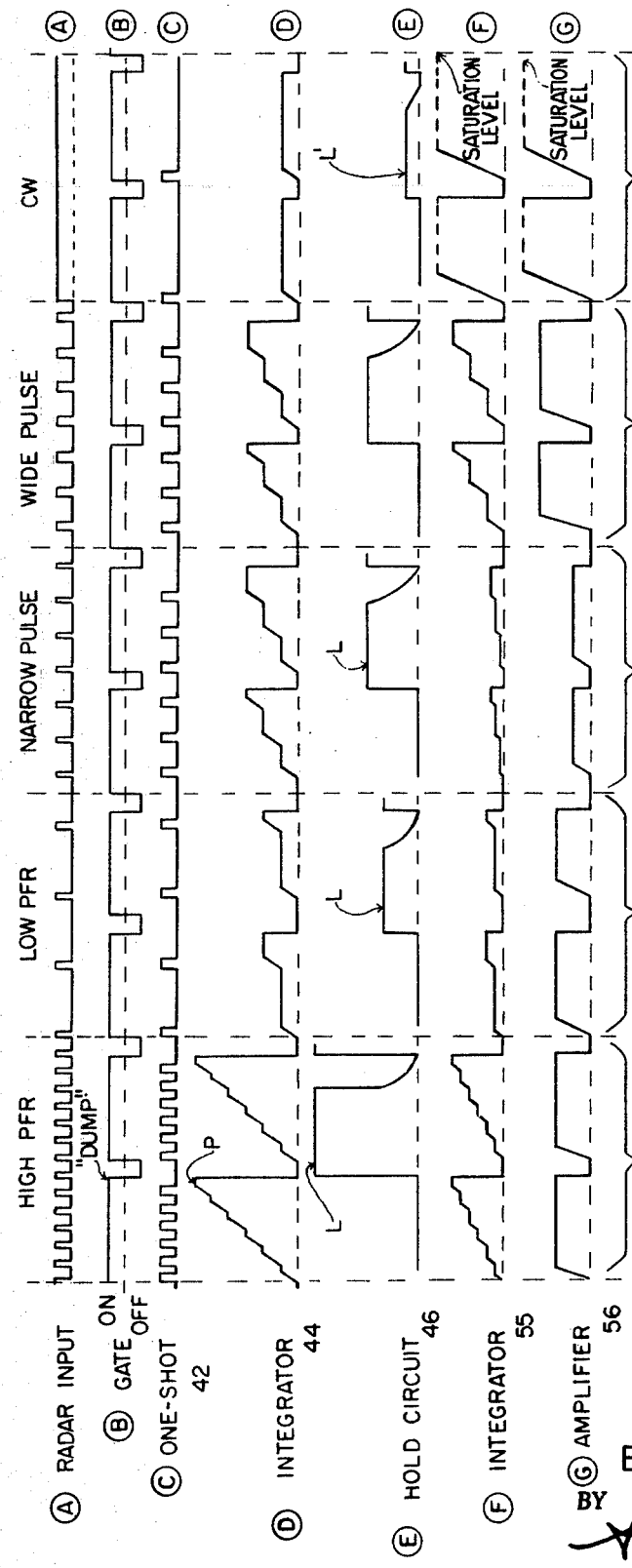

RADAR DETECTOR AND IDENTIFIER

DISCLOSURE

This invention relates to improvements in devices for detecting and identifying radar signals impinging thereupon, and more particularly to improvements in devices for identifying characteristics of the radar signals to more accurately determine whether the signals are propagated by a unit in friendly or enemy hands by determining the probable origin of the radar transmitting unit.

It is commonly recognized that radar units manufactured by different companies in different countries can usually be distinguished and identified by characteristics of their transmitted signals. In the case of pulse radar signals their pulse repetition frequencies (PRF) are usually different, and this fact has been used in the prior art as a criterion by which the transmitting radar can be identified using a portable device of the general type upon which this invention seeks to improve. Prior art systems are typified by such patents as Miller, U.S. Pat. No. 3,500,401, Rittenbach, U.S. Pat. No. 3,465,253, and Koontz, U.S. Pat. No. 2,602,883 all of which include some antenna means for receiving radar signals, means for detecting them, and means for somehow indicating their repetition rates. There are a variety of indicating means varying all the way from a mere audio listening device such as is shown in the Miller patent for listening to the PRF, to a more complex system in which the detected radar pulses are standardized by a multivibrator and integrated to form an analog level, which is then compared with a DC threshold level which drives an indicator, as shown in the patent to Rittenbach.

It is a principal object of this invention to add a new pulse-identification criterion to those employed in prior art devices in order to more accurately identify the radar equipment originating the pulses. Specifically, the present invention teaches novel means to determine the pulse width, as well as its repetition frequency, and to use both of these criteria simultaneously to permit the operator to determine the identity of the originating radar system.

It is another important object of the invention to provide an improved radar detector and identifier in which there are multiple separate channels, each useful for identifying a different radar source and each channel having separate adjustments by which it can be preset to be sensitive to a particular type of radar expected to be in common use in the environmental situation in which the apparatus is to be used. By providing plural separately pre-settable channels, the personnel carrying the device is relieved of the necessity of performing any adjustments or tuning operations while the device is in actual use. The channels are connected to separate indicators so that the operator need only look to see whether any of the associated indicators is responding to reception of a radar signal.

These indications may also be augmented by providing an earphone connected with a novel audio generator actuated by the video detecting system within the present device so as to make a signal frequency audible to the operator, as will be discussed hereinafter.

Still another object is to provide a device with multiple different antennas which are operative at different frequencies, preferably each comprising a small compact waveguide horn, whereby the system can be sensitive to radiations occurring at a number of different wavelengths. Such waveguide horns provide a degree of directional discrimination making it possible for the operator to determine roughly the direction from which the radar radiation is being transmitted, and the operator being able to selectively mask all except one of the horns at any particular time so as to get a rough approximation of the wavelength being received. Such directionality and frequency identification capabilities are highly informative to military personnel who are being illuminated by radar from an unknown source.

Other objects and advantages of the present invention will become apparent during the following discussion of the drawings, wherein:

FIG. 1 is a block diagram showing a system according to the present invention; and FIGS. 2, 3, 4, 5 and 6 are related columnized waveforms including shapes observed at 7 different locations, A through G, in the block diagram of FIG. 1 for different types of input signals to the radar detector device.

Referring now to FIG. 1, the detector and identifier device shown therein as an illustrative embodiment includes a plurality of antennas, as mentioned above preferably of the waveguide horn variety, each antenna including two diodes, one for detecting signals received in the horn, and the other for chopping the response of the horn in the manner of a gate for the purpose to be set forth hereinafter. The antenna 10 comprises a microwave horn designed to receive signals in the range of frequencies $f_1$–$f_2$. The horn 11 is selected to receive radiation in the range of frequencies $f_2$–$f_3$; the horn 12 receives signals in the range of frequencies $f_3$–$f_4$; and the horn 13 receives signals in the range of frequencies $f_4$–$f_5$. Their detector diodes are respectively labelled 14, 15, 16 and 17, and their gating diodes are respectively labelled 18, 19, 20 and 21. The gating diodes are connected to a timing pulse control line 22 which operates in a manner to be hereinafter explained, whereas the respective detecting diodes 14 through 17 are connected by wires 14a, 15a, 16a and 17a to a video combining circuit 25 which may also include amplification and is in the nature of an OR gate. This combining circuit delivers video signals on wire 26 to a series of video amplifiers, consisting in the illustrative embodiment of three wideband microintegrated circuit amplifiers 27, 28 and 29 having suitable AGC provisions in the manner which is quite usual now in operational-amplifier integrated circuits available from several different manufactures. The video output from the amplifiers appears on wire 30 and is returned to an AGC circuit 32 where it is amplified and applied through wires 33 and 34 to control the gain of at least some of the wideband operational amplifier chips.

The AGC amplifier 32 also has an output on wire 31 which is used to gate a tone generator 35 "on" and "off". The tone generator comprises an oscillator which is normally turned off in the absence of a radar signal received at any of the antennas 10 through 13, but when a signal of significant strength appears and an AGC level is established on wire 31, the tone generator is turned "on" to deliver an output tone to an attention-attracting transducer device, such as an earphone 36, the presence of a generated tone indicating the existence of a radar signal at one of the antennas. The use of this generator is desirable because although an operator could detect the presence of pulsed radar signals on the video output wire 30 by listening to the buzz caused by its pulse repetition frequency (PRF) as taught in the prior art, the operator could not detect the presence of a CW signal in the same manner. Therefore, the tone generator 35 provides an audible indication that a radar signal is being received and detected, and this audible indication is generated at a good listening frequency, for instance, in the range of 800 to 1,500 cycles per second. Moreover, the wire 26 coming from the video combiner 25 has its output signal integrated in an integrating circuit 37 whose output on wire 37a is used to vary the pitch of the generator 35 in order to assist the operator in obtaining an indication of signal maximum which is representative of the direction from which the radiation is coming. As the operator sweeps the detecting device back and forth in the azimuth direction he will be able to hear the pitch of the tone rise when he is pointing the device into a sector approximating the direction from which the radiation is coming, but will hear the pitch of the generator 35 fall off again when he has passed through the correct direction into a weaker signal direction occurring on either side of the optimum.

For the purpose of identifying the radar, the detected signal from one of the antennas is applied via the wire 30 and an amplitude clipper 39 into an input gate 40 whose output when enabled is a train of video signals which are then divided and delivered to an upper and a lower line of components as shown in FIG. 1. In the lower line of components there is a one-shot multivibrator 42, a first integrating amplifier 44 and a sample-and-hold circuit 46 which then puts out an analog voltage level on the wire 47 in the manner to be hereinafter explained. The purpose of this lower row of components is to provide an analog level such that its instantaneous value represents the PRF of the input signals to any one of the antennas.

The drawings of the second sheet, including FIGS. 2, 3, 4, 5 and 6, represent the waveforms at seven points in the circuit of FIG. 1 labelled A. B. C. D. E. F and G for various different input radar signals to an antenna. These radar input-signal waveforms are shown in the top row of figures opposite the letter A, FIG. 2 showing a high pulse repetition frequency with narrow pulses, FIG. 3 showing a much lower repetition frequency with pulses of the same width, FIG. 4 showing even narrower pulses received at an intermediate rate, and FIG. 5 showing the same repetition rate as FIG. 4 but with pulses which are about twice as wide. FIG. 6 shows the waveforms corresponding with continuous wave (CW) radar signals received at an antenna.

The circuitry of FIG. 1 also includes a 100 Hz multivibrator or oscillator 50 which runs at its own oscillating rate and is preferably not very stable as to frequency so that it will not tend to fall into step with, and remain synchronized with, the repetition frequency of a radar whose signal is being received. The waveform of the multivibrator 50 is shown in row B of FIGS. 2 through 6, and comprises timing pulses which are the same for all figures. Note from row B that the output of the multivibrator 50 is not symmetrical and that it is "on" most of the time and "off" for only brief intervals. This signal appears as timing pulses on wires 22 and 51 and is used for several purposes, including for instance the control of the gate 40 to render it conductive during the "on" period of the signal on wire 51. The timing pulses on wire 51 also cause the various integrating amplifiers to dump their signals at the point marked "dump" in FIG. 2B. The pulses on wire 51 also cause the sample-and-hold circuit 46 to sample and hold the integrated output at point D just before the integrating amplifier 44 is "dumped". For this purpose a small delay 49 is introduced so that the sample-and-hold circuit acquires a correct reading at the top of the step function shown in row D of FIG. 2 before the integrating amplifier 44 has its voltage level "dumped".

Discussing now in greater detail the manner in which the pulse repetition frequency is measured by the system, the amplitude-clipped input on wire 30 to the gate 40 comprises a row of video pulses whose repetition frequency is determined by the radar which is being monitored and whose pulse widths are also determined by the transmitting radar. Since the lower circuit including the components 42 through 44 is intended to measure only pulse repetition frequency, the present circuit standardizes the widths of the radar pulses using a one-shot multivibrator 42, which puts out a pulse increment of constant width for each input video pulse as shown in row C of FIGS. 2, 3, 4 and 5. The CW waveforms of FIG. 6 will be discussed presently. The output waveform C from the one-shot multivibrator 42 is then introduced as an increment to be integrated into the integrating amplifier 44 to provide an ultimate peak analog level as shown at P in FIG. 2D. This peak-level is sampled and held during the next timing pulse on wire 51 from the 100 Hz multivibrator 50 in response to the trailing edge of the "on" signal of waveform B in FIG. 2. However, a very brief delay is introduced by the delay circuit 49 into the "dump" signal so that the "dump" signal on wire 49a which actuates the integrating amplifier 44 will dump that amplifier's accumulated voltage level only after the sample-and-hold circuit 46 has sampled that level in response to the signal on wire 51. As can be seen by comparing the waveforms D and E in FIGS. 2, 3 and 4 the analog level L, which is sampled and held on wire 47 as shown in each of the waveforms E, varies directly as the repetition frequency of the radar pulse, it being greatest for a high pulse repetition rate as shown in FIG. 2 and smallest for a low pulse repetition rate as shown in FIG. 3.

If the input radar signal is a CW signal, the output of the 100 Hz multivibrator 50 on wire 22, i.e. namely the negative going timing pulse of waveform B, chops the input signal from whichever antenna horn is receiving the CW radar energy, this chopping being accomplished by periodically pulsing the gating diodes 18, 19, 20 and 21 with the waveform on wire 22 to short circuit the waveguides. Thus, for a CW signal the repetition frequency as seen by the one-shot multivibrator 42 becomes the chopping rate of the 100 Hz multivibrator 50. Hence, the pulse rate for a CW signal becomes 100 Hz. This permits the integrating amplifier 44 to integrate to a minimal level L' in FIG. 6E, with the result that the analog level held on wire 47 in response to a CW signal at the antenna is the lowest level of which the system is capable. Whatever the radar input signal to the device, its pulse repetition frequency is represented as an analog voltage L whose level is shown in row E of FIGS. 2, 3, 4, 5 and 6, the level being highest for a high PRF and lowest for CW input to the device.

Referring now to the upper row of components connected with the gate 40 in FIG. 1, these components include a second integrator 55 and an operational amplifier 56 whose gain is controlled inversely by the first analog level appearing on wire 48 for the purpose hereinafter discussed. It is the purpose of these components to determine pulse width of the radar signal received via the antenna and to have the pulse width at any particular instant represented by a second analog level appearing on wire 57, as shown in waveform G of the second sheet of drawings including FIGS. 2 through 6. In seeking to determine pulse width, the present disclosure takes note of the fact that the pulse width multiplied by the pulse repetition frequency yields a product which is proportional to the duty cycle of the received radar signal. Moreover, it is both possible and convenient to obtain an integrated level proportional to that duty cycle by integrating the video output of the gate 40 in the second integrator 55 to provide a signal which is similar to one of the waveforms shown in row F of FIGS. 2, 3, 4, 5 and 6. However, this integrated representation of the duty cycle appearing in waveform F is proportional not only to pulse width, but also is proportional to pulse repetition frequency, i.e. proportional to the product of the two. On the other hand, a previous paragraph explained how the device has obtained an analog level proportional to pulse repetition frequency in the first integrator 44 for the signals currently being received at an antenna. Therefore, if the duty cycle value appearing as waveform F on wire 58 is modified to remove the component thereof which represents pulse repetition frequency, there will result on wire 57 a second analog level which is proportional only to instantaneous pulse width. This is accomplished in the operational amplifier 56 which performs an operation akin to division on the incoming duty cycle level on wire 58. The amplifier 56 is of a standard type having an AGC input attached to wire 48 through which its gain is inversely controlled by the first analog instantaneous PRF level. By adjusting the circuit constants, it is a simple matter to effectively divide the waveform F by a scaled-down waveform similar to waveform D, and thereby produce an analog output level on wire 57, representing pulse width as shown in waveform G in FIGS. 2, 3, 4, 5 and 6.

Note that the second analog level waveform in FIG. 2G has the same level as the waveform in FIG. 3G, because the radar pulse width in FIGS. 2A and 3A are the same. The level in FIG. 4G is lower because the pulse width is narrower than it is in FIGS. 2 and 3; however, in FIG. 5G the radar pulse width is much wider and therefore the level appearing on wire 57 is quite high. In FIG. 6G, representing a CW radar signal having an infinite pulse width, the output on wire 57 reaches a saturation level.

Summarizing the portion of the circuitry discussed to this point, the system now has an analog voltage level appearing on wire 47 which represents pulse repetition frequency and is greatest for the highest frequency; and the system has a second analog level on the wire 57 representing pulse width, and this level is greatest for the widest pulse or for a CW input. These two analog levels appearing on wires 47 and 57 are then delivered to some suitable circuit for indicating their levels to the operator so that he can determine whether the pulse comes from a friendly or enemy radar, assuming that he knows their radar-pulse characteristics. In the present system, these analog levels appearing on wires 47 and 57 are compared with predetermined voltages which are preferably preset into the system before the unit goes into a combat situation. However, it is to be clearly understood that the present system could use other types of indicator units for indicating the levels of these analog voltages, for instance, such as calibrated meters as shown in the reference Koontz.

Referring again to FIG. 1, suppose that there are three comparison channels all connected in parallel to receive the analog voltages appearing on wires 47 and 57. The comparator 60, the comparator 62 and the comparator 64 comprise differential amplifiers having one input connected to the wire 57 and the other input connected to one of three calibration resistances 61, 63 and 65. All of these resistors are connected across a source such as a battery 69 which puts out a standard comparison voltage. The output of each comparator controls the illumination of a light bulb, such as the light 66, 67 or 68, which lights whenever the analog voltage on the wire 57 matches the input from the calibration resistor 61, 63 or 65. These calibration resistors are preset, for instance, to deliver voltage levels matching the analog levels which represent pulse widths known to be used by the various radars which are expected to be encountered, either enemy radars, or friendly radars, or a combination of both. Thus, when a radar signal lights one of the lights 66, 67, or 68, the operator knows its pulse width which is one factor that he can use in deciding whether it is a friendly or enemy radar pulse that is being currently received. Any one of the calibrating resistors 61, 63 or 65 can be set for detecting a CW signal by turning it to a voltage matching saturation level, as shown for instance in FIG. 6G.

The other analog output voltage on wire 47 is connected to one input of a different voltage comparator in each identification channel, these voltage comparators being labelled 70, 72 and 74 and having their other inputs respectively connected with three calibrating resistors 71, 73 and 75 which are connected across the same battery 69. In view of the fact that the analog output in the waveform E is a constant level depending upon the pulse repetition frequency, the calibrating resistors 71, 73 and 75 can likewise be set to any three radar pulse repetition frequencies expected to be encountered, perhaps a mixture of enemy and friendly repetition frequencies. Thus, the channels No. 1, No. 2 and No. 3 are respectively adjustable to recognize three different radar sets, although in a practical device the number of channels can be compounded to recognize any number of radar sets as desired. The light bulbs 76, 77 and 78 are operated respectively by the comparators 70, 72 and 74 when the latter have both input voltages equal, namely the inputs respectively from the wire 47 on the one hand and from a calibration resistor on the other hand.

This type of present channel requires no moment-to-moment adjusting on the part of the operating personnel to identify a particular radar signal intercepted by the device, but on the other hand has the disadvantage of being somewhat less flexible than a system having separate output meters respectively for indicating the analog voltage levels on the wires 47 and 57, which meters would be calibrated in terms of pulse repetition frequency and pulse width. The latter type of device, however, requires more highly trained personnel to operate it. There are of course other indicators that can be used to provide satisfactory means for identifying the illuminating radar.

It is to be understood that the above description and drawings are only illustrative, and that the inventive features are presented in the following claims.

I claim:

1. A device for detecting the presence of radar signals and identifying the type of radar emitting them by indicating pulse repetition frequency (PRF) and pulse width of the signals, comprising:
   a. means for receiving and detecting said signals to obtain corresponding video signals;
   b. PRF determining means including means for delivering standardized increments in response to detected video signals and including first integrating means responsive to said delivered increments to deliver a first analog level proportional to the radar signal PRF;
   c. pulse width determining means including second integrating means responsive to the detected video signals to deliver an integrated level proportional to the duty cycle of said video signals, and including operational amplifier means for amplifying said integrated duty-cycle level, and the amplifier means having gain control means coupled to be inversely controlled by said first analog level to deliver from the amplifier means a second analog level proportional to pulse width of the radar signal; and
   d. means for indicating said first and second analog levels.

2. In a device as set forth in claim 1, free-running oscillator means for generating timing pulses; gate means controlled by said timing pulses and connected to accept said detected video signals and deliver a train of them when enabled by the timing pulses to said means for delivering standardized increments to said first integrating means; sample-and-hold means actuated by said timing pulses to sample-and-hold the output level of the first integrating means when said train of video pulses has been delivered; and means responsive to said timing pulses for dumping the content of the first integrating means after the sample-and-hold means has been actuated.

3. In a device as set forth in claim 2, said means for delivering standardized increments comprising a one-shot responsive to said video signals to generate and deliver discrete pulses of standardized width and height.

4. In a device as set forth in claim 2, said gate means being connected to accept said detected video signals and deliver a train of them when enabled by the timing pulses to said means for determining pulse width; means in the second integrating means for integrating the video signals in each train to obtain said integrated level proportional to duty cycle; and means responsive to said timing pulses for dumping the content of the second integrating means after said integrated level is reached.

5. In a device as set forth in claim 1, free-running oscillator means for generating timing pulses; gate means controlled by said timing pulses and connected to accept said detected video signals and deliver a train of them when enabled by the timing pulses to said means for determining PRF and to said means for determining pulse width; means in the second integrating means for integrating the video signals in each train to obtain said integrated level proportional to duty cycle; and means responsive to said timing pulses for dumping the content of the both integrating means after said integrated level is reached.

6. In a system as set forth in claim 5, means for coupling said timing pulses to said radar signal receiving means and operative in response thereto to periodically chop the response thereof whereby one wide video pulse comprises the video signal train which is delivered to said gate means when said radar signals are of the continuous wave type.

7. In a system as set forth in claim 1, AGC amplifier means coupling the detected video signals to said PRF and pulse width determining means; a gated audio tone generator; transducer means for making its tone audible; and means for coupling the AGC level of the amplifier means to said gated tone generator to render it operative only when the AGC level indicates the reception of a radar signal.

8. In a system as set forth in claim 7, said tone generator having a voltage controllable pitch; and integrator means for integrating detected video signals to obtain a voltage proportional to their strength, the voltage being coupled to said tone generator to control its pitch as an indication of received signal strength.

* * * * *